(12) United States Patent
Tateishi

(10) Patent No.: US 11,600,447 B2
(45) Date of Patent: Mar. 7, 2023

(54) FILM CAPACITOR, COMBINATION TYPE CAPACITOR, INVERTER, AND ELECTRIC VEHICLE

(71) Applicant: KYOCERA Corporation, Kyoto (JP)

(72) Inventor: Tatsuya Tateishi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 1 day.

(21) Appl. No.: 16/981,832

(22) PCT Filed: Mar. 20, 2019

(86) PCT No.: PCT/JP2019/011775
§ 371 (c)(1),
(2) Date: Sep. 17, 2020

(87) PCT Pub. No.: WO2019/188684
PCT Pub. Date: Oct. 3, 2019

(65) Prior Publication Data
US 2021/0098197 A1 Apr. 1, 2021

(30) Foreign Application Priority Data
Mar. 29, 2018 (JP) .............................. JP2018-064800

(51) Int. Cl.
*H01G 4/224* (2006.01)
*H01G 4/32* (2006.01)

(52) U.S. Cl.
CPC ............... *H01G 4/32* (2013.01); *H01G 4/224* (2013.01)

(58) Field of Classification Search
CPC ............ H01G 4/224; H01G 4/14; H01G 4/32; H01G 4/015
See application file for complete search history.

(56) References Cited

U.S. PATENT DOCUMENTS

| 2,706,742 A | * | 4/1955 | Ehlers | H01G 2/12 174/564 |
| 5,331,504 A | * | 7/1994 | Kamiya | H01G 2/12 361/301.1 |
| 2011/0102966 A1 | | 5/2011 | Takeoka et al. | |

(Continued)

FOREIGN PATENT DOCUMENTS

| CN | 102089839 A | 6/2011 |
| JP | 56-083019 A | 7/1981 |

(Continued)

*Primary Examiner* — David M Sinclair
(74) *Attorney, Agent, or Firm* — Volpe Koenig

(57) ABSTRACT

A film capacitor includes a main body portion shaped in a rectangular prism, and a pair of external electrodes. The main body portion includes dielectric films and metallic films which are laminated, and includes a pair of first faces opposed to each other, a pair of first side faces opposed to each other, and a pair of second side faces opposed to each other, the pair of first side faces connecting the pair of first faces, the pair of second side faces connecting the pair of first faces. The pair of external electrodes is located on the pair of first side faces. The second side faces are covered with an insulating cover layer. The film capacitor includes a grease-containing portion between the second side face and the insulating cover layer, the grease-containing portion including an insulating grease.

11 Claims, 4 Drawing Sheets

(56) References Cited

U.S. PATENT DOCUMENTS

| | | | | |
|---|---|---|---|---|
| 2012/0033342 A1* | 2/2012 | Ito | ................. | H01G 4/224 |
| | | | | 361/301.4 |
| 2016/0372264 A1* | 12/2016 | Maeda | ................. | H02M 7/003 |
| 2019/0122819 A1 | 4/2019 | Kikuchi | | |

FOREIGN PATENT DOCUMENTS

| | | | | | |
|---|---|---|---|---|---|
| JP | 57080709 A | * | 5/1982 | ........... | H01F 41/127 |
| JP | 59121817 A | * | 7/1984 | | |
| JP | 61174619 A | * | 8/1986 | | |
| JP | 06-236828 A | | 8/1994 | | |
| JP | 0770428 B2 | * | 7/1995 | | |
| JP | 2001-319826 A | | 11/2001 | | |
| JP | 2004-303934 A | | 10/2004 | | |
| JP | 2015-153998 A | | 8/2015 | | |
| WO | 2017/159672 A1 | | 9/2017 | | |

* cited by examiner

FILM CAPACITOR, COMBINATION TYPE CAPACITOR, INVERTER, AND ELECTRIC VEHICLE

CROSS-REFERENCE TO RELATED APPLICATIONS

This application is a national stage entry according to 35 U.S.C. 371 of International Application No. PCT/JP2019/011775 filed on Mar. 20, 2019, which claims priority to Japanese Patent Application No. 2018-064800 filed on Mar. 29, 2018, the contents of which are entirely incorporated herein by reference.

TECHNICAL FIELD

The present disclosure relates to a film capacitor, a combination type capacitor, an inverter, and an electric vehicle.

BACKGROUND

For example, a film capacitor includes a dielectric film made of polypropylene resin in film form, and a metallic film formed on a surface of the dielectric film by vapor deposition. The metallic film is used as an electrode. In the film capacitor so constructed, in the event of electrical short-circuiting occurring at an insulation defect point in the dielectric film, the metallic film lying around the defect point is volatilized for release by short-circuiting-induced energy thereby causing electrical insulation in the insulation defect point of the dielectric film. The film capacitor including such a self-healing capability is resistant to dielectric breakdown.

With its resistance to troubles such as ignition or electric shock that arise when an electric circuit electrical short-circuits, the film capacitor has recently been put to an increasingly wider range of uses, including application to a power circuit for LED (Light Emitting Diode) illumination, etc., application to motorized drive for a hybrid car, and application to an inverter system for photovoltaic power generation.

Film capacitors are classified into a wound type and a laminated type. As wound type film capacitors, those in the form of a circular or elliptic cylinder are in common use. As laminated type film capacitors, those in the form of a rectangular prism are used, and advances in miniaturization of laminated type film capacitors have allowed them to grow in use.

In the case of a laminated type film capacitor, it is frequently manufactured by cutting an elongate laminate into separate capacitor main bodies. This, of necessity, requires enhancement in electrical insulation at a cut end surface of each main body. As approaches to achieving greater electrical insulation at a cut end surface, for example, Japanese Unexamined Patent Publication JP-A 2015-153998 (Patent Literature 1) discloses a metallic film pattern such that a metallic film left exposed at a cut end surface of a main body is not subjected to voltage application. Japanese Unexamined Patent Publication JP-A 06-236828 (1994) (Patent Literature 2) discloses placement of an insulating resin layer on a cut end surface of a main body.

SUMMARY

A film capacitor according to the disclosure includes: a main body including dielectric films and metallic films which are laminated, the main body being shaped in a rectangular prism including a pair of first faces opposed to each other, a pair of first side faces opposed to each other, and a pair of second side faces opposed to each other, the pair of first side faces connecting the pair of first faces, the pair of second side faces connecting the pair of first faces; a pair of external electrodes disposed on the pair of first side faces; an insulating cover layer which covers the pair of second side faces; and a grease-containing portion disposed between each of the pair of second side faces and the insulating cover layer, the grease-containing portion containing an insulating grease.

A combination type capacitor according to the disclosure includes: a plurality of film capacitors; and at least one bus bar electrically connecting all of the plurality of film capacitors, the plurality of film capacitors including the film capacitor mentioned above.

An inverter according to the disclosure comprises: a bridge circuit including switching elements; and a capacitance member connected to the bridge circuit, the capacitance member including the film capacitor mentioned above.

An electric vehicle according to the disclosure includes: a power supply; the inverter mentioned above, connected to the power supply; a motor connected to the inverter; and wheels driven by the motor.

DETAILED DESCRIPTION

Figure 1:
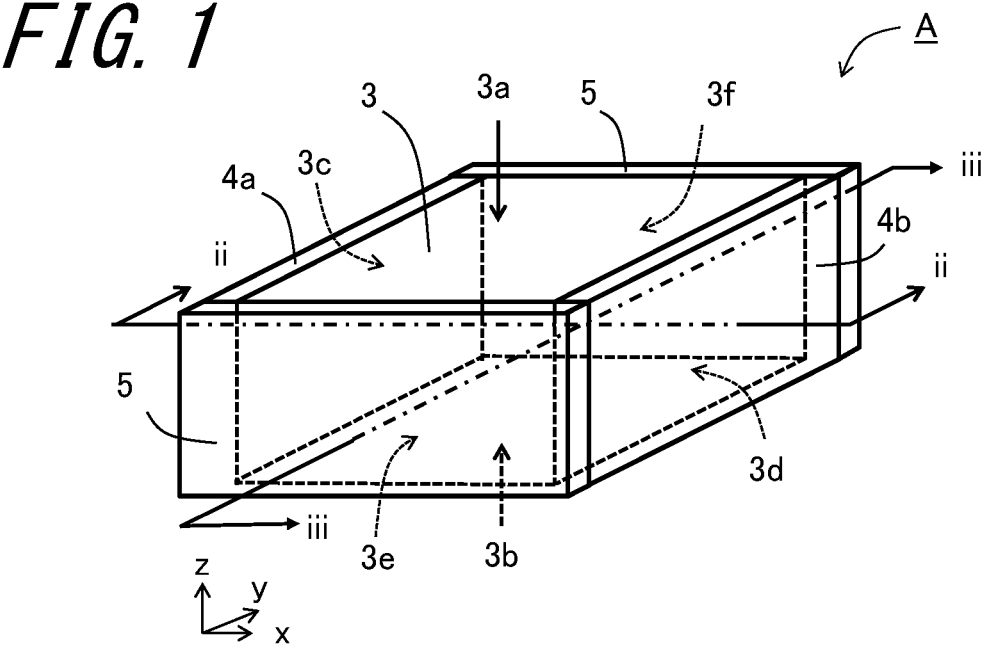
FIG. 1 is a perspective view showing an example of a laminated type film capacitor.
Figure 2:
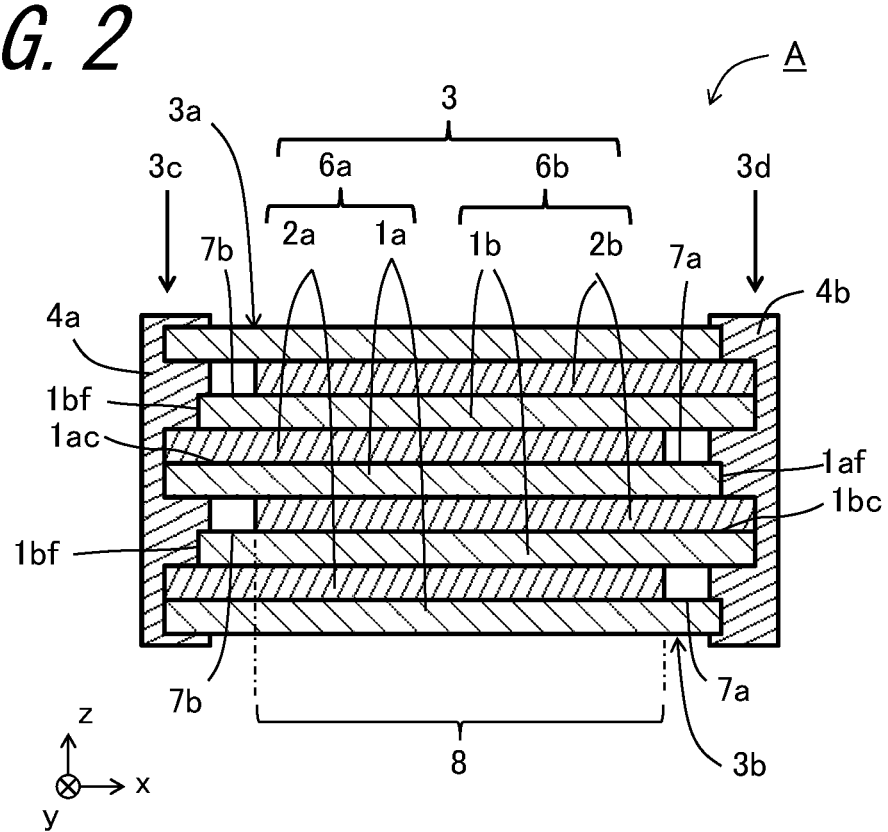
FIG. 2 is a sectional view taken along the line ii-ii in FIG. 1.

As shown in FIGS. 1 and 2, a laminated type film capacitor includes a film capacitor main body portion 3 and a pair of external electrodes, namely a first external electrode 4a and a second external electrode 4b. The film capacitor main body portion 3 will also be hereinafter called merely "main body portion 3". The main body portion 3 includes a first dielectric film 1a, a first metallic film 2a, a second dielectric film 1b, and a second metallic film 2b which are laminated. The main body portion 3 is shaped in a rectangular prism including a pair of opposite first faces 3a and 3b located in opposed positions in a direction of lamination of the dielectric films and the metallic films, i.e. a lamination direction, and a pair of first side faces 3c and 3d and a pair of second side faces 3e and 3f, the pair of first side faces 3c and 3d connecting the first faces 3a and 3b, the pair of second side faces 3e and 3f connecting the first faces 3a and 3b. In each drawing to be referred to, the relative sizes of the individual constituent components are exaggerated for the sake of clarity in illustration, and the actual thickness of each component is thus very small relatively to the dimensions of the main body portion 3.

The first external electrode 4a and the second external electrode 4b are attached to the first side face 3c and the first side face 3d, respectively, of the main body portion 3 by means of Metallikon. An insulating cover layer 5 is disposed on each of the second side faces 3e and 3f of the main body portion 3.

FIG. 2 is a sectional view taken along the line ii-ii in FIG. 1. In the main body portion 3 of the laminated type film capacitor A shown in FIG. 2, first metallized films 6a and second metallized films 6b are alternately laminated, the first metallized films 6a each including the first dielectric film 1a and the first metallic film 2a deposited on a face 1ac of the first dielectric film 1a, the second metallized films 6b each including the second dielectric film 1b and the second metallic film 2b deposited on a face 1bc of the second dielectric film 1b. The first metallic film 2a is electrically connected to the first external electrode 4a at the first side face 3c of the main body portion 3. The second metallic film 2b is electrically connected to the second external electrode 4b at the first side face 3d of the main body portion 3. As shown in FIG. 1, a direction of arrangement of the first external electrode 4a and the second external electrode 4b is defined as a first direction x, and, a direction of arrangement of the cover layers 5 is defined as a second direction y. Moreover, a thickness direction of the first dielectric film 1a and the second dielectric film 1b, i.e. the lamination direction, is defined as a third direction z.

The first metallized film 6a is obtained by forming the first metallic film 2a on the face 1ac of the first dielectric film 1a. In the first metallized film 6a, on a part of the face 1ac near a side 1af, there is disposed a so-called insulation margin 7a, in the form of a continuous portion extending in the second direction y, where the first dielectric film 1a is left bare of the first metallic film 2a.

The second metallized film 6b is obtained by forming the second metallic film 2b on the face 1bc of the second dielectric film 1b. In the second metallized film 6b, on a part of the face 1bc near a side 1bf, there is disposed a so-called insulation margin 7b, in the form of a continuous portion extending in the second direction y, where the second dielectric film 1b is left bare of the second metallic film 2b.

As shown in FIG. 2, the metallized films 6a and 6b are laminated on one another so as to be slightly displaced in relation to each other in the first direction x, i.e. a width direction.

Upon a potential difference between the first metallic film 2a and the second metallic film 2b, capacitance is set up in an effective region 8 where the first metallic film 2a and the second metallic film 2b overlap with each other, with the first dielectric film 1a or the second dielectric film 1b lying in between.

The following describes a procedure for forming such a laminated type film capacitor A. At first, a laminate is produced by laminating the elongated first and second metallized films 6a and 6b on one another so that they are slightly displaced in relation to each other in the first direction x, i.e. the width direction. In the resulting laminate, the external electrode 4a and the second external electrode 4b are formed by Metallikon on the first side face 3c and the first side face 3d, respectively, aligned in the first direction x. The laminate formed with the external electrodes 4, namely the first external electrode 4a and the second external electrode 4b, is cut up in the first direction x to obtain separate component pieces. The external electrode 4 may be formed after the laminate cutting-up operation, that is; the external electrode 4 may be formed on each of the resulting separate main body portions 3. Cut end surfaces of the laminate correspond to the second side faces 3e and 3f of each main body portion 3.

Figure 3:
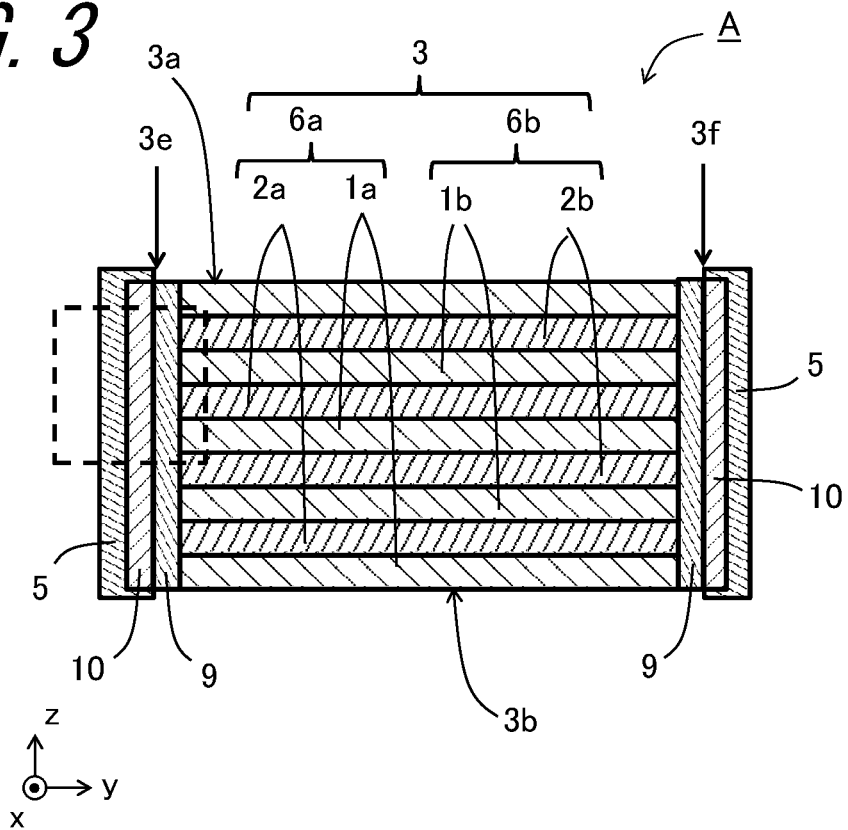
FIG. 3 is a sectional view taken along the line iii-iii in FIG. 1.

The following description of the present embodiment deals with such characteristics as are common to the first metallized film 6a and the second metallized film 6b of the film capacitor A, and hence, as shown in FIG. 3, with the reference letters "a" and "b" omitted, the first/second dielectric film, the first/second metallic film, the first/second external electrode, and the first/second metallized film may also be hereinafter called merely the dielectric film 1, the metallic film 2, the external electrode 4, and the metallized film 6, respectively.

Figure 4:
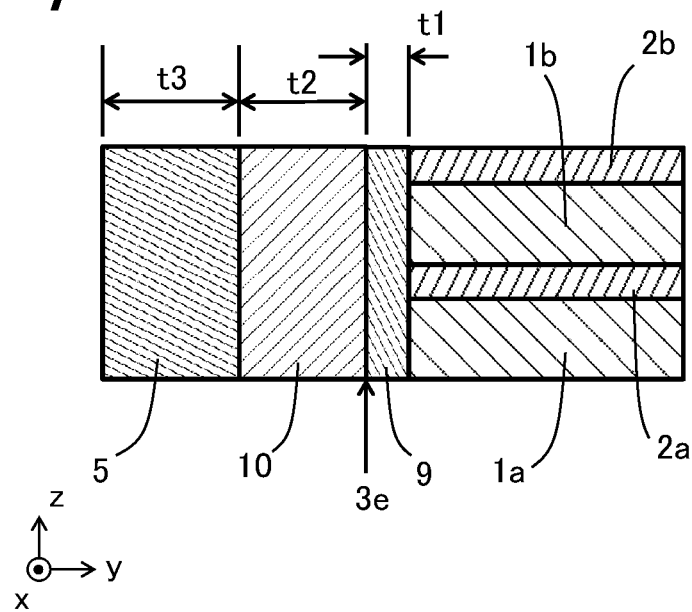
FIG. 4 is an enlarged sectional view showing a portion of FIG. 3 enclosed within dashed outlines.

FIG. 3 is a sectional view taken along the line iii-iii in FIG. 1, and, FIG. 4 is an enlarged view showing a portion of FIG. 3 enclosed within dashed outlines. As shown in FIGS. 3 and 4, the main body portion 3 may be provided at each second side face 3e, 3f with an insulating layer 9. In FIGS. 3 and 4, the second side face 3e, 3f of the main body portion 3 corresponds to the surface of the insulating layer 9. The cover layer 5 covers the second side face 3e, 3f, or equivalently covers the insulating layer 9. Between the cover layer 5 and the insulating layer 9, a grease-containing portion 10 is disposed.

The insulating layer 9 is formed of a mixture of an organic resin material constituting the dielectric film 1 and a metallic component constituting the metallic film 2. The insulating layer 9, which forms under a mechanical shock and heat caused by the laminate cutting-up operation, is also referred to as a kneaded layer. In the insulating layer 9, the metallic component is dispersed in the resin material thereby achieving insulation. For example, an average thickness t1 of the insulating layer 9 shown in FIG. 4 is about 0.5 μm to 4 μm. Although the main body portion 3 is illustrated as being provided at its second side face 3e, 3f with the insulating layer 9 in FIGS. 3 and 4, the second side face 3e, 3f may be free of the insulating layer 9.

The grease-containing portion 10 is a portion containing an insulating grease. The grease is formed of a liquid lubricant with a thickener dispersed in it. The grease is higher in viscosity and lower in fluidity than oil, and is thus semisolid or semifluid at room temperature. The grease may be present not only on the surface of the insulating layer 9, i.e. the second side face 3e, 3f, but also in a concavity of the insulating layer 9, a clearance between the dielectric film 1 and the metallic film 2, and a gap between the dielectric films 1. The free-flowing grease may easily enter such a concavity or gap. Thus, the entry of the grease into a potentially defective area such as the concavity, i.e. the thin part of the insulating layer 9, helps reduce the occurrence of electrical discharge between the metallic films 2 at the potentially defective area.

Moreover, even if electrical discharge occurs between the metallic films 2, the discharge-caused hot gas swiftly is dispersed through the grease-containing portion 10 containing the free-flowing grease. This makes the dielectric film 1 less prone to carbonization under hot gas, and thus makes the film capacitor A less prone to a decrease in insulation resistance.

The cover layer 5 covers the second side face 3e, 3f, and also covers the grease-containing portion 10. The cover layer 5 may be configured so that a part thereof directly covers part of the second side faces 3e and 3f and part of the first faces 3a and 3b of the main body portion 3.

The film capacitor A including the cover layer 5 may be partly or wholly covered with a not-illustrated exterior resin. The external electrode 4 may be connected to an external circuit by a lead wire, a bus bar, or the like.

The grease of the grease-containing portion 10 is enclosed in the film capacitor A via at least one of the cover layer 5, the insulating layer 9, the dielectric film 1, the metallic film 2, and the external electrode 4. The free-flowing grease enclosed in the film capacitor A is less likely to leak out of the film capacitor A.

Any flowable grease having high insulation performance may be used for the grease. For example, the grease may be of a liquid lubricant-containing grease such as a fluorine grease, a silicone grease, a poly-α-olefin (PAO) grease, or a phenyl ether grease. Each such grease exhibits high resistance to heat and high chemical stability, and is thus resistant to carbonization even in high-temperature conditions. Moreover, each such grease has little effect on the organic resin used as the material of construction of the dielectric film 1. The silicone grease, in particular, has greater insulation performance, greater heat resistance, and greater moisture resistance. The use of the silicone grease as the grease contained in the grease-containing portion 10 of the film capacitor A makes the film capacitor A much less likely to suffer a decrease in insulation resistance.

For example, an average thickness t2 of the grease-containing portion 10 shown in FIG. 4 may be greater than or equal to 10 μm and less than or equal to 100 μm. In fact, the grease may find its way into, for example, the concavity of the insulating layer 9, the clearance between the dielectric film 1 and the metallic film 2, and the gap between the dielectric films 1, and, such a grease-applied area is also included in the grease-containing portion 10. With this in view, a spacing between the cover layer 5 and each of the second side faces 3e and 3f in the direction x is defined as the thickness t2 of the grease-containing portion 10. Setting the average thickness t2 at a value greater than or equal to 10 μm enables the grease-containing portion 10 to reduce a decrease in insulation resistance in the film capacitor A. Setting the average thickness t2 at a value less than or equal to 100 μm can reduce the influence of the grease-containing portion 10 on the sizing of the film capacitor A. More specifically, the average thickness t2 may be greater than or equal to 20 μm and less than or equal to 80 μm, or may be greater than or equal to 25 μm and less than or equal to 50 μm, in particular.

The cover layer 5 has insulation performance, and serves to enclose the grease contained in the grease-containing portion 10. For example, the cover layer 5 may be formed of any of resin materials, including silicone, polyimide, polyphenylene sulfide, and cycloolefin polymer. Each such resin material has high insulation performance and high heat resistance.

For example, an average thickness t3 of the cover layer 5 shown in FIG. 4 may be greater than or equal to 3 μm and less than or equal to 80 μm. Setting the average thickness t3 at a value greater than or equal to 3 μm enables the cover layer 5 to enclose the grease contained in the grease-containing portion 10 satisfactorily. Setting the average thickness t3 at a value less than or equal to 80 μm can reduce the influence of the cover layer 5 on the sizing of the film capacitor A. More specifically, the average thickness t3 may be greater than or equal to 20 μm and less than or equal to 60 μm, or may be greater than or equal to 30 μm and less than or equal to 50 μm, in particular.

Moreover, the sum of t2 and t3, given as: t2+t3, may be less than or equal to 100 μm, or may be less than or equal to 80 μm, in particular.

For example, the thickness of each of the cover layer 5, the insulating layer 9, and the grease-containing portion 10 may be determined through the observation of a section of the film capacitor A under a microscope or a scanning electron microscope (SEM). The presence or absence of the grease-containing portion 10 can be checked by analyzing components present between the cover layer 5 and each of the second side faces 3e and 3f in accordance with a certain analytical method such as Inductively-Coupled Plasma (ICP) atomic emission spectroscopy, an element assay such as Fluorescent X-ray analysis, X-ray diffraction (XRD) analysis, Gas Chromatography-Mass Spectrometry (GC-MS), Fourier Transform-Infrared Spectroscopy (FT-IR), or Nuclear Magnetic Resonance (NMR) spectroscopy.

The grease-containing portion 10 and the cover layer 5 may be formed on the cut end surfaces of the main body portion 3, i.e. the second side faces 3e and 3f, in the following manner, for example.

The grease is applied to each cut end surface of the main body portion 3. A method for applying the grease may be selected from among heretofore known methods, including various print-coating methods, e.g. screen printing, a spray coating method, a roller coating method, and a dip coating method. The print-coating method, in particular, permits easy adjustment of coating target areas, coating amount, and coating thickness.

Moreover, the cover layer 5 is formed on the grease-coated cut end surface. For example, the cover layer 5 may be formed by applying a precursor containing an insulating resin to the cut end surface, and thereafter curing the precursor. The precursor may be of a so-called adhesive. For example, when using a moisture-curable silicone adhesive as the precursor, the precursor cures upon taking up moisture within or without the film capacitor A. This makes the film capacitor A more resistant to high temperature and high humidity. A method for applying the precursor may be selected from among heretofore known coating methods as mentioned above. Alternatively, the cover layer 5 may be formed of an insulating resin tape. The resin tape may include an adhesive layer.

Thus, the film capacitor A includes the insulating cover layer 5 for covering the second side faces 3e and 3f, and also includes the grease-containing portion 10 disposed between each of the second side faces 3e and 3f and the cover layer 5. The insulating grease contained in the grease-containing portion 10 has flowability, and thus finds its way into a potentially defective area at the second side faces 3e and 3f, i.e. cut end surface. As a result, electrical discharge is less likely to occur at the cut end surface. Moreover, even if electrical discharge occurs at the cut end surface, the discharge-caused hot gas is swiftly dispersed through the grease-containing portion 10 containing the free-flowing grease. This makes the film capacitor A less prone to a decrease in insulation resistance.

Moreover, the cover layer 5 and the grease-containing portion 10, even when configured so that the sum of their thickness, given as: t2+t3, is less than or equal to 100 μm, are adequate to make the film capacitor A less prone to a decrease in insulation resistance. That is, the film capacitor A including the cover layer 5 and the grease-containing portion 10 is capable of delivering greater performance without the necessity of a considerable increase in its size.

Figure 5:
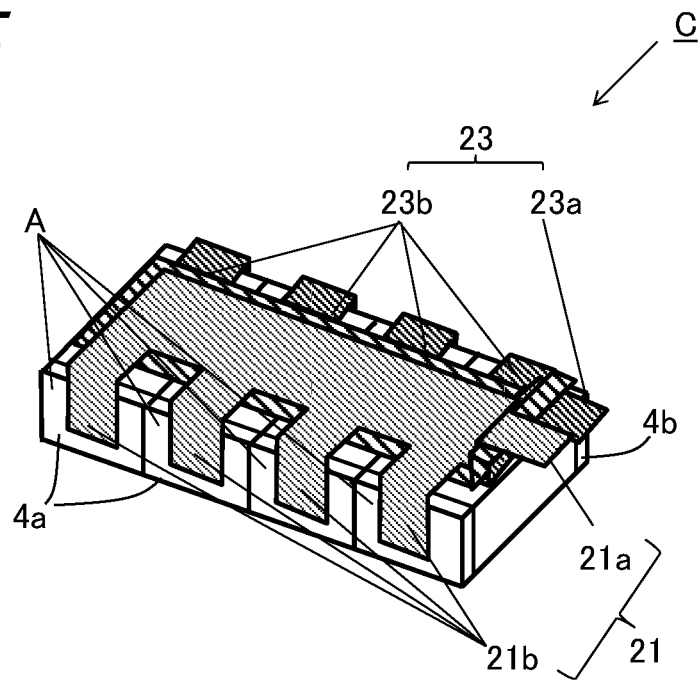
FIG. 5 is a perspective view schematically showing an example of a combination type capacitor.

FIG. 5 is a perspective view schematically showing an example of a combination type capacitor. For ease in understanding the structure of the combination type capacitor, the illustration of a case and an exterior resin for covering the surface of the capacitor is omitted from FIG. 5. The combination type capacitor C includes a plurality of laminated type film capacitors connected in parallel with each other via a pair of bus bars 21 and 23. The bus bar 21 includes a terminal portion 21a for external connection and an extraction terminal portion 21b, and, the bus bar 23 includes a terminal portion 23a for external connection and an extraction terminal portion 23b. The extraction terminal portion 21b is connected to the external electrode 4a of the film capacitor, and the extraction terminal portion 23b is connected to the external electrode 4b of the film capacitor.

The use of the above-described film capacitor A including the cover layer 5 and the grease-containing portion 10 as the film capacitor included in the combination type capacitor C makes it possible to obtain the combination type capacitor C which is less prone to a decrease in insulation resistance.

The combination type capacitor C may include at least one film capacitor A, or two or more film capacitors A. The combination type capacitor C includes an arrangement of a plurality of film capacitors, for example, an arrangement of four film capacitors as shown in FIG. 5, with the bus bars 21 and 23 attached via joining materials to the external electrodes provided at both ends of the main body portion 3.

The combination type capacitor C may be constructed of either a side-by-side arrangement of the film capacitors as shown in FIG. 5 or a stack of the film capacitors. Moreover, the film capacitors may be aligned so that the direction of arrangement of the external electrodes 4, i.e. the first direction x, conforms to a vertical direction.

Figure 6:
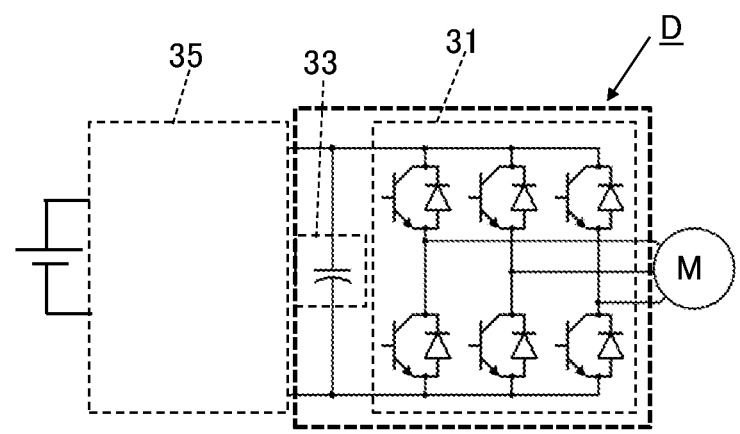
FIG. 6 is a schematic configuration diagram for explaining an example of an inverter.

FIG. 6 is a schematic configuration diagram for explaining an example of an inverter. FIG. 6 shows an inverter D for producing alternating current from direct current. As shown in FIG. 6, the inverter D includes a bridge circuit 31 and a capacitance member 33. For example, the bridge circuit 31 includes switching elements such as IGBTs (Insulated gate Bipolar Transistors) and diodes. The capacitance member 33 is interposed between input terminals of the bridge circuit 31 for voltage stabilization. The inverter D includes the above-described film capacitor A as the capacitance member 33.

The inverter D is connected to a booster circuit 35 for boosting DC power voltage. The bridge circuit 31 is connected to a motor generator M which serves as a drive source.

Figure 7:
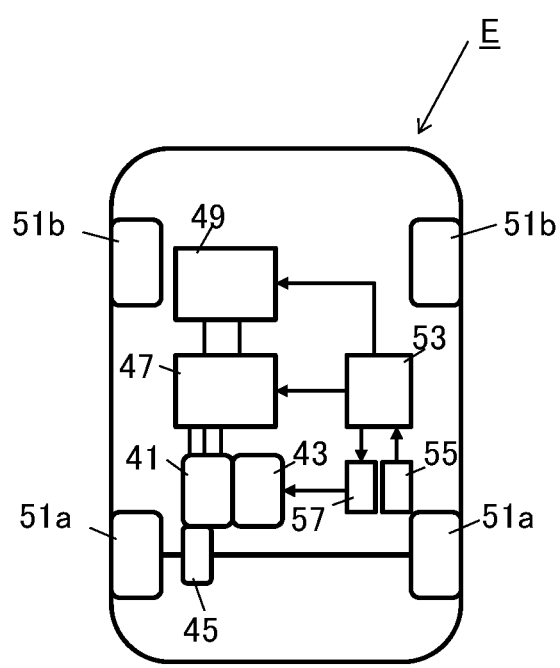
FIG. 7 is a schematic configuration diagram showing an example of an electric vehicle.

FIG. 7 is a schematic configuration diagram showing an electric vehicle. FIG. 7 shows a hybrid electric vehicle (HEV) as an example of the electric vehicle.

The electric vehicle E includes a drive motor 41, an engine 43, a transmission 45, an inverter 47, a power supply or battery 49, front wheels 51a, and rear wheels 51b.

The electric vehicle E yields output via the motor 41 or the engine 43, or both of them, serving as a drive source. Output from the drive source is transmitted to a pair of right-hand and left-hand front wheels 51a through the transmission 45. The power supply 49 is connected to the inverter 47, and the inverter 47 is connected to the motor 41.

Moreover, the electric vehicle E shown in FIG. 7 includes a vehicle ECU 53 and an engine ECU 57. The vehicle ECU 53 exercises overall control of the electric vehicle E. The engine ECU 57 controls a rotation speed of the engine 43 to drive the electric vehicle E. The electric vehicle E further includes driving devices such as an ignition key 55, and a non-illustrated accelerator pedal and a non-illustrated brake, which are operated by a driver or others.

Drive signals responsive to the operation of the driving devices by a driver or others are inputted to the vehicle ECU 53. The vehicle ECU 53 outputs instruction signals to the engine ECU 57, the power supply 49, and the inverter 47 as a load based on the drive signals. The engine ECU 57 controls a rotation speed of the engine 43 in response to the instruction signals to drive the electric vehicle E.

The inverter D, i.e. the inverter D including the above-described film capacitor A as the capacitance member 33, is used as the inverter 47 of the electric vehicle E. In such an electric vehicle E, the film capacitor A is less prone to a decrease in insulation resistance. Thus, although, for example, the engine parts of the electric vehicle E operate under harsh working conditions as is often the case, the lowering of insulation resistance in the film capacitor A can be minimized for a long period of time. This enables the control unit such as the ECU to exercise more stable current control in the electric vehicle E.

The inverter D according to this embodiment can be applied not only to the hybrid electric vehicle (HEV) as described above, but also to various power conversion application products such as an electric vehicle (EV), a fuel cell vehicle, an electric bicycle, a power generator or a solar cell.

EXAMPLES

A dielectric film measuring 3.0 μm in average thickness was prepared using polyarylate (U-100) manufactured by UNITIKA, Ltd. The dielectric film was obtained by dissolving the polyarylate in toluene, applying the resulting resin solution onto a polyethylene terephthalate (PET)-made base film with a coater, shaping the resulting coating into a sheet, and heat-treating the shaped resin sheet at a temperature of 130° C. to remove toluene.

After being removed from the base film, the resulting dielectric film was slit into a 200 mm-wide film. On one of the opposite surfaces of the 200 mm-wide dielectric film, an Al metallic film was formed by vacuum vapor deposition. A metallized film was thus obtained. The vapor deposition process was carried out so that the resulting Al metallic film measured 180 mm in width with use of a metal mask and an oil mask. The oil mask was formed by transferring Fomblin Oil onto the dielectric film with a pattern roll. Note that the metallic film was provided with an electrode pattern having the function of acting as a fuse.

The metallic film was found to be 40 nm-thick and include a sheet resistance of 8.0 Ω/□. The film thickness of the metallic film was determined through the observation of a section of the ion milling-treated metallized film under a scanning electron microscope (SEM). As to the sheet resistance (Rs), an electrode pattern-free portion of the metallic film was cut away to obtain a test piece measuring 10 mm in width (w) and 300 mm in length (l), and, the value of resistance (R) across the ends of the metallic film piece was determined by the four-terminal resistance measurement method. Thus, the sheet resistance (Rs) was calculated in accordance with the formula: Rs=R×w/l.

The 180 mm-wide metallized film was further slit into a 30 mm-wide metallized film including a 1.5 mm-wide insulation margin.

A wound body was made from 500 turns of a set of two 30 mm-wide metallized films, wound around a drum. Prior to being wound, the two metallized films were laminated on one another while being offset in the width direction with respect to each other by 5 mm so as to include their metallic film-bearing dielectric film portions projected toward the corresponding ends of the construction in the width direction. A portion cut from the wound body was removed from the drum to obtain a laminate in strip form measuring 100 mm in length, 30.5 mm in width, and 3.1 mm in thickness.

The strip-shaped laminate was flattened by press molding, and, a zinc-tin alloy was sprayed onto each of the paired end faces, i.e. the first side faces, of the laminate in the width direction to form Metallikon external electrodes. At this time, a part of the first side face subjected to cutting-up operation was masked with a 5 mm-wide polyimide tape to prevent adhesion of Metallikon material. The cutting-up pitch was set at 20 mm.

The strip-shaped laminate provided with the external electrodes was cut with a cutter into pieces, each serving as a main body portion including the external electrodes. As the cutter, Band Saw K-100 manufactured by HOZAN TOOL IND. CO., LTD. was used, and as the cutting blade, K-100-2 was used. The cutting rate was set at 200 m/min.

The cut end surface, i.e. the second side face, of each of the resulting pieces was coated with a silicone grease (91003 manufactured by Synco Chemical Corporation) by screen printing. The coating was made with varying thickness: 10 µm, 25 µm, and 50 µm.

Sample Nos. 1 through 3 were made to include a cover layer obtained by applying a silicone adhesive (TB1220H manufactured by ThreeBond Co., Ltd.) onto the silicone grease coating by screen printing, and thereafter letting the silicone adhesive cure for 24 hours at room temperature. The thickness of the silicone adhesive was set at 30 µm. Sample Nos. 4 through 6 were made to include a cover layer obtained by bonding a 50 µm-thick polyimide tape onto the silicone grease coating. In forming Sample No. 7, the silicone adhesive was applied directly to the second side face without grease application. In Sample No. 8, neither the grease-containing portion nor the cover layer was formed on the second side face.

After soldering a plating wire to the external electrode of each of the resulting film capacitors, each film capacitor was stored in a case made of polyphenylene sulfide (PPS). As an exterior resin, epoxy resin was poured into the gap between the film capacitor and the case, and then cured under heat.

Each film capacitor so obtained was evaluated for insulation resistance (IR) and dielectric strength. Insulation resistance measurement was carried out with an insulation resistance meter (Digital Super Megohmmeter DSM-8104 manufactured by HIOKI E.E. Corporation). Dielectric strength measurement was carried out with a breakdown tester (Insulation Resistance Tester TOS9201 manufactured by KIKUSUI ELECTRONICS CORP.) As evaluation conditions, voltage was applied to each film capacitor while raising the level of voltage from 0 V to 1000 V at a voltage increasing rate of 10 V per second, and a voltage at which a current of 10 mA or above passed through the film capacitor for one second or more was defined as determinative of the dielectric strength of the film capacitor. After the dielectric strength measurement, insulation resistance measurement was conducted once again. Each sample was found to include an insulation resistance of not smaller than 1 GΩ prior to being subjected to dielectric breakdown test. Table 1 provides the dielectric strength, as well as the insulation resistance obtained after the dielectric breakdown test, of each film capacitor.

Following the completion of evaluation, each sample was cut along the line iii-iii as shown in FIG. 1. By observation of the cut end surface of the sample under a scanning electron microscope (SEM), the thickness t1 of the insulating layer shown in FIG. 3 was determined. Moreover, by observation of the cut end surface under a digital microscope, the thickness t2 of the grease-containing portion 10 and the thickness t3 of the cover layer 3 was determined. Table 1 provides measurement outcomes.

TABLE 1

| Sample No. | Cover layer | t1 µm | t2 µm | t3 µm | t2 + t3 µm | Dielectric strength V | IR Ω |
|---|---|---|---|---|---|---|---|
| 1 | TB1220H | 1.7 | 50 | 30 | 80 | 910 | 1.6 G |
| 2 | TB1220H | 2.0 | 25 | 30 | 55 | 980 | 2.4 G |
| 3 | TB1220H | 2.4 | 10 | 30 | 40 | >1000 | 1.8 G |
| 4 | Tape | 2.3 | 50 | 50 | 100 | >1000 | 2.0 G |
| 5 | Tape | 2.0 | 25 | 50 | 75 | 940 | 2.2 G |
| 6 | Tape | 2.2 | 10 | 50 | 60 | 960 | 1.8 G |
| 7 | TB1220H | 2.1 | — | 30 | 30 | 810 | 3.4 k |
| 8 | — | 2.3 | — | — | — | 630 | 5.1 k |

Sample Nos. 1 through 6, each including the grease-containing portion and the cover layer made of silicone or polyimide, exhibited a dielectric strength at a level greater than 900 V, and also exhibited an insulation resistance at a level not smaller than 1 GΩ after the dielectric breakdown test. Sample No. 1, in particular, while including the insulating layer with a relatively small thickness t1, succeeded in attaining a dielectric strength at a level not smaller than 900 V by virtue of the grease-containing portion.

On the other hand, Sample Nos. 7 and 8, each including no grease-containing portion, exhibited a dielectric strength at a level less than 900 V, and suffered a significant decrease in insulation resistance after the dielectric breakdown test due to the occurrence of electrical discharge at the cut end surface. These samples also showed signs of discharge-caused resin carbonization at the cut end surface.

REFERENCE SIGNS LIST

A: Laminated type film capacitor
C: Combination type capacitor
D: Inverter
E: Electric vehicle
1, 1a, 1b: Dielectric film
2, 2a, 2b: Metallic film
3: Main body portion
  3a, 3b: First face
  3c, 3d: First side face
  3e, 3f: Second side face
4, 4a, 4b: External electrode
5: Cover layer
6, 6a, 6b: Metallized film
7, 7a, 7b: Insulating margin
9: Insulating layer
10: Grease-containing portion
21, 23: Bus bar
31: Bridge circuit
33: Capacitance member
35: Booster circuit
41: Motor
43: Engine
45: Transmission
47: Inverter
49: Power supply
51a: Front wheel
51b: Rear wheel
53: Vehicle ECU
55: Ignition key
57: Engine ECU

The invention claimed is:
1. A film capacitor, comprising:
a main body portion comprising dielectric films and metallic films which are laminated, the main body portion being shaped in a rectangular prism comprising a pair of first faces opposed to each other, a pair of first side faces opposed to each other, and a pair of second side faces opposed to each other, the pair of first side faces connecting the pair of first faces, the pair of second side faces connecting the pair of first faces;

a pair of external electrodes on the pair of first side faces;

an insulating cover layer which covers the pair of second side faces; and a grease-containing portion between each of the pair of second side faces and the insulating cover layer, the grease-containing portion comprising an insulating grease, and wherein between the grease-containing portion and the dielectric films and metallic films is an insulating layer, and wherein a part of the insulating cover layer directly covers part of the pair of first faces.

2. The film capacitor according to claim 1,
wherein the grease-containing portion comprises a silicone grease.

3. The film capacitor according to claim 1,
wherein the insulating cover layer comprises at least one of silicone, polyimide, polyphenylene sulfide, and cycloolefin polymer.

4. The film capacitor according to claim 1,
wherein an average thickness of the grease-containing portion is greater than or equal to 10 μm and less than or equal to 100 μm.

5. The film capacitor according to claim 1, wherein an average thickness of the insulating cover layer is greater than or equal to 3 μm and less than or equal to 80 μm.

6. The film capacitor according to claim 1, wherein each of the pair of second side faces is between the insulating layer and the grease-containing portion.

7. The film capacitor according to claim 1, wherein the dielectric films are inside the pair of external electrodes.

8. The film capacitor according to claim 1, wherein the insulating cover layer covers the grease-containing portion.

9. A combination type capacitor, comprising:
a plurality of film capacitors; and
at least one bus bar electrically connecting all of the plurality of film capacitors,
the plurality of film capacitors comprising the film capacitor according to claim 1.

10. An inverter, comprising:
a bridge circuit comprising switching elements; and
a capacitance member connected to the bridge circuit,
the capacitance member comprising the film capacitor according to claim 1.

11. An electric vehicle, comprising:
a power supply;
the inverter according to claim 10, connected to the power supply;
a motor connected to the inverter; and
wheels driven by the motor.

* * * * *